(12) United States Patent
Lerios

(10) Patent No.: US 8,983,917 B2
(45) Date of Patent: Mar. 17, 2015

(54) SYSTEMS AND METHODS FOR LOSSLESS COMPRESSION OF IMAGE COLOR PROFILES

(71) Applicant: Apostolos Lerios, Austin, TX (US)

(72) Inventor: Apostolos Lerios, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 17 days.

(21) Appl. No.: 13/677,201

(22) Filed: Nov. 14, 2012

(65) Prior Publication Data

US 2014/0136492 A1    May 15, 2014

(51) Int. Cl.
    *G06F 17/00*    (2006.01)
    *G06F 17/30*    (2006.01)

(52) U.S. Cl.
    CPC .................................. *G06F 17/3089* (2013.01)
    USPC ........... 707/693; 707/758; 345/418; 345/501; 358/1.9

(58) Field of Classification Search
    None
    See application file for complete search history.

(56) References Cited

U.S. PATENT DOCUMENTS

| | | | | |
|---|---|---|---|---|
| 6,704,024 | B2 * | 3/2004 | Robotham et al. | 345/581 |
| 7,242,406 | B2 * | 7/2007 | Robotham et al. | 345/581 |
| 8,411,106 | B2 * | 4/2013 | Ten et al. | 345/604 |
| 8,437,039 | B2 * | 5/2013 | Murata | 358/1.9 |
| 8,847,976 | B2 * | 9/2014 | Ollivier | 345/600 |
| 2004/0109179 | A1 * | 6/2004 | Haikin et al. | 358/1.9 |
| 2005/0128498 | A1 * | 6/2005 | Matsuzaki | 358/1.9 |
| 2005/0174586 | A1 * | 8/2005 | Yoshida et al. | 358/1.9 |
| 2006/0285760 | A1 * | 12/2006 | Malvar | 382/248 |
| 2007/0008558 | A1 * | 1/2007 | Rumph et al. | 358/1.9 |
| 2007/0296984 | A1 * | 12/2007 | Kress | 358/1.9 |
| 2009/0092316 | A1 * | 4/2009 | Matsuzaki | 382/167 |
| 2009/0174726 | A1 * | 7/2009 | Ollivier | 345/600 |
| 2010/0002010 | A1 * | 1/2010 | Li et al. | 345/590 |
| 2010/0128059 | A1 * | 5/2010 | Shih | 345/604 |
| 2010/0194753 | A1 * | 8/2010 | Robotham et al. | 345/428 |
| 2010/0245857 | A1 * | 9/2010 | Plummer | 358/1.9 |
| 2014/0040743 | A1 * | 2/2014 | Constable et al. | 715/722 |
| 2014/0071102 | A1 * | 3/2014 | Pieper et al. | 345/207 |

* cited by examiner

*Primary Examiner* — Hung Le
(74) *Attorney, Agent, or Firm* — Baker Botts L.L.P.

(57) ABSTRACT

Techniques to allow for accurate color representation of images stored within and delivered by a social networking system. In an embodiment, a match between at least a portion of a longest tag value from a plurality of tag values and a subsequence of a tagged element data string in a tag-based file associated with an image is identified. The tagged element data string and a tag table are optimized based on the match.

54 Claims, 10 Drawing Sheets

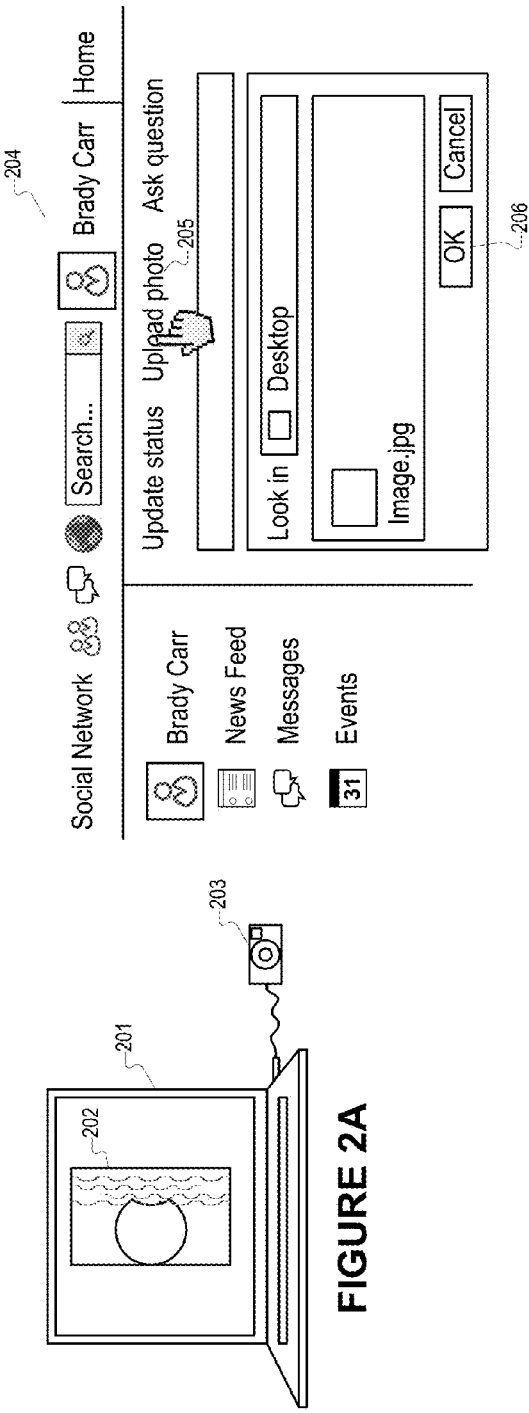
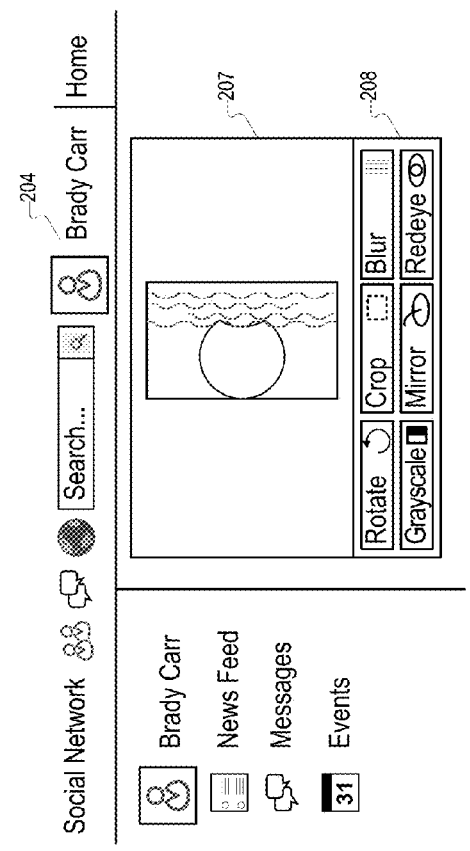
FIGURE 2A
FIGURE 2B
FIGURE 2C

501

| Signature | Data |
|---|---|
| 1 | a |
| 2 | b |
| 3 | abc |
| 4 | de |
| 5 | cd |
| 6 | de |

| Signature | Offset | Size |
|---|---|---|
| 1 | 0 | 1 |
| 2 | 1 | 1 |
| 3 | 2 | 3 |
| 4 | 5 | 2 |
| 5 | 7 | 2 |
| 6 | 9 | 2 |
| TED: | ababcdecdde | |
| size: | 11 | |

| Signature | Offset | Size |
|---|---|---|
| 1 | 0 | 1 |
| 2 | 1 | 1 |
| 3 | 2 | 3 |
| 4 | 5 | 2 |
| 5 | 7 | 2 |
| 6 | 5 | 2 |
| TED: | ababcdecd | |
| size: | 9 | |

| Signature | Offset | Size |
|---|---|---|
| 1 | 0 | 1 |
| 2 | 1 | 1 |
| 3 | 0 | 3 |
| 4 | 3 | 2 |
| 5 | 5 | 2 |
| 6 | 3 | 2 |
| | | |
| TED: | abcdecd | |
| size: | 7 | |

| Signature | Offset | Size |
|---|---|---|
| 1 | 0 | 1 |
| 2 | 1 | 1 |
| 3 | 0 | 3 |
| 4 | 3 | 2 |
| 5 | 2 | 2 |
| 6 | 3 | 2 |
| | | |
| TED: | abcde | |
| size: | 5 | |

SYSTEMS AND METHODS FOR LOSSLESS COMPRESSION OF IMAGE COLOR PROFILES

FIELD OF THE INVENTION

The present invention relates to the field of social networking. More particularly, the present invention provides a technique for facilitating accurate color representation of images stored within and delivered by a social networking system.

BACKGROUND

Internet social networks have become a significant phenomenon. Social networks allow an internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Often, most information on a user's profile is only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as images. Users may assemble albums that include photographs and other content and share their albums with their friends. Because of their collaborative nature, social networks have now become the preferred means by which many people share photos and other media content.

In addition, as technology has evolved, tools have emerged for accessing social networks from a growing variety of technology platforms. Images uploaded to a social network may be accessed from a variety of different devices. In addition to the different capabilities and features of the devices that generate images, the devices that are used to access images uploaded to the social network may also have different capabilities and features for displaying images. Consequently, each device may render an image differently.

SUMMARY

To allow for accurate color representation of images stored within and delivered by a social networking system, embodiments of the invention include systems, methods, and computer readable media to facilitate transforming an image from a first color space to a second color space. A match between at least a portion of a longest tag value from a plurality of tag values and a subsequence of a tagged element data string in a tag-based file associated with an image is identified. The tagged element data string and a tag table are optimized based on the match.

In an embodiment, the match comprises a match between at least one trailing character of the at least one tag value and at least one leading character of the tagged element data string. In an embodiment, the optimizing comprises prepending a portion of the at least one tag value that is not present in the tagged element data string to the tagged element data string.

In an embodiment, the match comprises a match between at least one leading character of the at least one tag value and at least one trailing character of the tagged element data string. In an embodiment, the optimizing comprises appending a portion of the at least one tag value that is not present in the tagged element data string to the tagged element data string.

In an embodiment, remaining tag values from the plurality of tag values are added to the tagged element data string in order from a longest remaining tag value to a shortest remaining tag value. In an embodiment, at least one sentinel character is added to the tagged element data string. In an embodiment, at least one zero is substituted for the at least one sentinel character in the tagged element data string. In an embodiment, the optimizing comprises compressing the tagged element data string based on run-length encoding.

In an embodiment, the optimizing is based further on a format specification. In an embodiment, the tag table comprises at least one offset value, at least one size value, and at least one signature. In an embodiment, the at least one offset value is a multiple of four. In an embodiment, the optimizing comprises creating a shortest possible tagged element data string. In an embodiment, the at least one tag value is associated with a dependent tag. In an embodiment, at least one character in the tagged element data string is designated as a wildcard character to match an undefined portion of the dependent tag.

In an embodiment, the match comprises a match between a first tag value from the plurality of tag values and a second tag value from the plurality of tag values. In an embodiment, the match comprises a match between a first tag value from the plurality of tag values and a subsequence of a second tag value from the plurality of tag values. In an embodiment, the match comprises a match between a first tag value from the plurality of tag values and a subsequence that spans a boundary between a second tag value from the plurality of tag values and a third tag value from the plurality of tag values.

Many other features and embodiments of the invention will be apparent from the accompanying drawings and from the following detailed description.

BRIEF DESCRIPTION OF THE DRAWINGS

FIG. 2A illustrates a user of a social networking system copying to his computer a photograph taken with his digital camera in accordance with an embodiment of the invention.

FIG. 2B illustrates the user accessing a user interface to upload the photograph to the social networking system in accordance with an embodiment of the invention.

FIG. 2C illustrates the photograph uploaded to the social networking system and displayed within a user interface in accordance with an embodiment of the invention.

FIG. 5A illustrates a table of example tag data in accordance with an embodiment of the invention.

FIG. 5B illustrates an example partial tag-based file with no data sharing in accordance with an embodiment of the invention.

FIG. 5C illustrates an example partial tag-based file with data shared between equivalent tag values in accordance with an embodiment of the invention.

FIG. 5D illustrates an example partial tag-based file with data shared between subsequences of tag values in accordance with an embodiment of the invention.

FIG. 5E illustrates an example partial tag-based file with data shared across boundaries of tag values in accordance with an embodiment of the invention.

Figure 1:
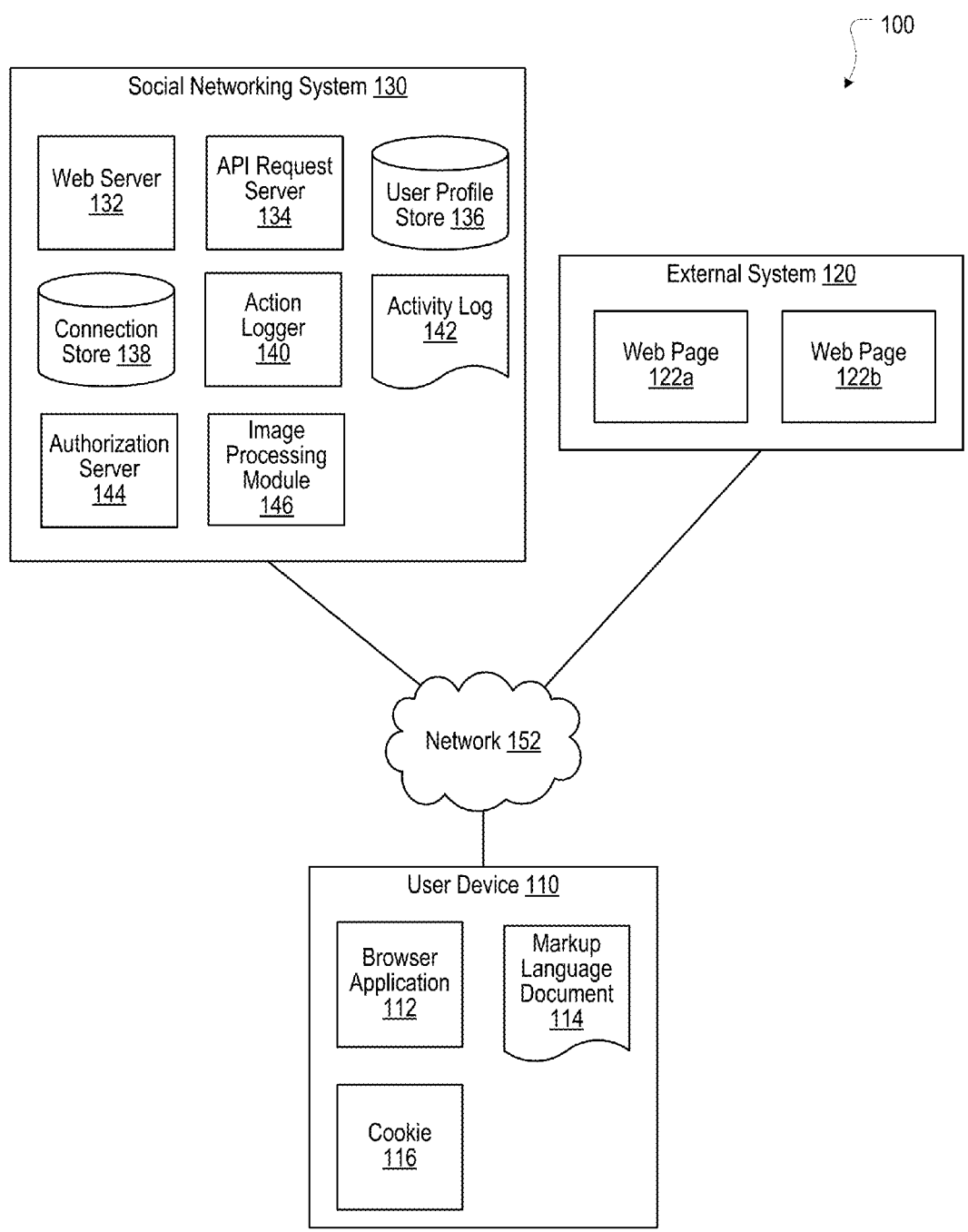
FIG. 1 is a network diagram of a system for facilitating accurate color representation of images stored within a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for facilitating accurate color representation of images stored within a social networking system in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable modification of the data communicated from the social networking system 130 to the user device 110.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 130 may be administered, managed, or controlled by an operator. The operator of the social networking system 130 may be a human being, an automated application, or a series of applications for managing content, regulating policies, and collecting usage metrics within the social networking system 130. Any type of operator may be used.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and an image processing module 146. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may also include an image processing module 146. The image processing module 146 may be implemented as a single component or as multiple components. The image processing module 146 may analyze images provided to the social networking system 130 and create color profiles to facilitate transforming the images from one color space to another color space.

Lossless Image Compression

Users may take advantage of the collaborative features and functionality of the social networking system 130 to upload and share digital images. A user of the social networking system 130 may upload a profile picture that features prominently on her profile and identifies her to friends and other users. A user may also upload a cover image that may be displayed as a banner across the top of the user's profile. In addition to a profile picture and a cover image, a user may upload images to share with other users, such as photographs of an event, artwork, professional photography portfolios, photographs from nature, or any other type of digital images.

Figure 2D:
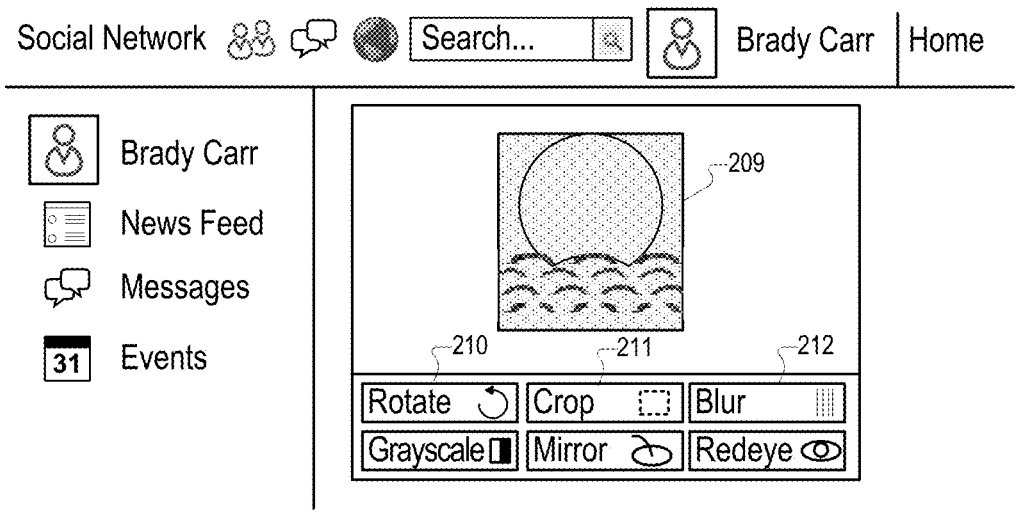
FIG. 2D illustrates the user applying a number of edits to the photograph, resulting in an altered photograph in accordance with an embodiment of the invention.

FIGS. 2A-2D illustrates online photo sharing functionality of the social networking system 130 in accordance with an embodiment of the invention. In FIG. 2A, user Brady Carr has copied to a computer 201 a photograph 202 taken with a digital camera 203. In FIG. 2B, Brady Carr has accessed a user interface 204 to upload the photograph 202 to the social networking system 130. Brady Carr selects an 'upload' option 205 within the user interface 204 that prompts him to browse to the location of the photograph 202 on the local storage of the computer 201. He locates the photograph 202 and selects an 'OK' option 206. In FIG. 2C, the photograph 202 has been uploaded to the social networking system 130 and is displayed within the user interface 204. The user interface 204 in FIG. 2C includes a photo editing panel 207 with an options toolbar 208. In FIG. 2D, Brady Carr has applied a number of edits to the photograph 202, resulting in the altered photograph 209. These edits include a 90 degree rotation, indicated by a 'rotate' button 210, a crop, indicated by a 'crop' button 211, and a blur, indicated by a 'blur' button 212. Brady Carr may finalize and submit these edits by selecting the 'Save' option.

Digital images may be expressed within a color space. A color space refers to an abstract mathematical model for representing the colors that comprise an image. Color spaces help to ensure consistency in color representation across the potentially numerous different devices that may display a digital image. For example, the photograph 202 in FIGS. 2A-2D may be created by the digital camera 203, copied to the computer 201, uploaded to the social networking system 130, and downloaded to a user device 110. The digital camera 203, the computer 201, the social networking system 130, and the user device 110 may each interpret the photograph 202 with reference to a color space.

A digital image may comprise a series of pixels. Each pixel may be represented as a triplet of numerical values. In one type of color space, these values correspond to the levels of red (R), green (G), and blue (B) primary colors present in the pixel. This type of color space is known as the RGB color space. There are multiple RGB color spaces depending on exactly which shade or hue of red, green, and blue is used as the primary color for R, G, and B. In one implementation of an RGB color space, each of the RGB values may be expressed as an integer between 0 and 255, i.e., a byte. A value of 0 may correspond to the darkest shade of a primary color, whereas a value of 255 may correspond to the lightest shade. Thus, [0, 0, 0] corresponds to black, and [255, 255, 255] corresponds to white. An RGB color space may be conceptualized as a device-specific color space, since it defines color parameters that are customized for a particular device. Each device may use a unique shade of each of the red, blue, and green primary colors.

Often, because different color spaces are best suited for different purposes, it may be necessary to transform an image from one color space to another color space. For example, the XYZ color space is among the most well-established and widely recognized color spaces in use today. The XYZ color space relies on visual stimulus values and color-matching functions to achieve a high degree of precision in expressing an image as perceived by the human eye. Unlike the RGB color space, the XYZ color space is an absolute color space. Absolute color spaces may express color without reference to external factors, such as the device-specific red, green, and blue primary colors of an RGB color space. To optimize the display of an image on a different device from the device on which it was created, it may be desirable to transform the image from a device-specific color space such as RGB to an absolute color space such as XYZ. Such color space transformations are facilitated by color profiles associated with digital images. A color profile provides a model for transforming an image from one color space to another color space. The color profile of an image file may represent the color space transformation between a color space unique to the image (e.g., specific to the device that generated the image) and some absolute color space.

Color profile files may take many forms. A common format for color profiles relies on standard specifications defined by the International Color Consortium, an industry organization that defines cross-platform color management standards. The standard specifications may use a tag-based file format to represent color space transformations. The tag-based format may include a profile header, a tag table, and a tagged element data string. The header may be a fixed-length section structured in a format dictated by a standard specification. The header may contain information that every file formatted to comply with the standard specification is required to contain, e.g., version information. The tag table may be a lookup table that specifies which portion of the tagged element data string corresponds to particular fields. The tag table may comprise rows corresponding to tags, wherein each row includes data fields that specify, for example, the offset and size values for a tag. An offset value specifies where in the tagged element data string a tag begins, and a size value specifies how many characters the tag comprises. The offset value may be determined such that the leftmost character in the tagged element data string resides at location zero. In an embodiment, the offset value may be determined relative to the first byte of the profile header. The specifications define the set of tags that may or must be present in a color profile, and also may impose some constraints on the contents of the tagged element data string.

Figure 3:
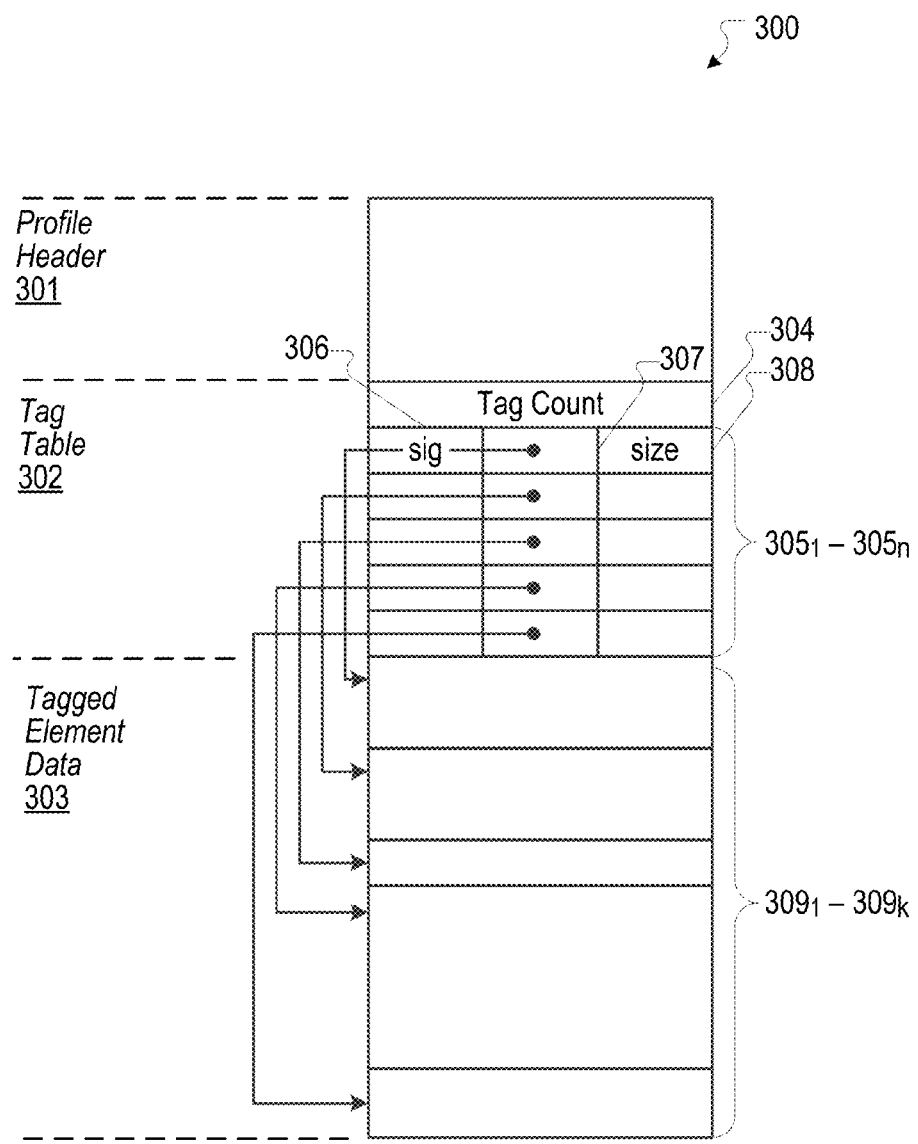
FIG. 3 illustrates an example diagram of a tag-based file in accordance with an embodiment of the invention

FIG. 3 illustrates an example diagram of a tag-based file 300 in accordance with an embodiment of the invention. The tag-based file 300 comprises a profile header 301, a tag table 302, and tagged element data 303. In an embodiment, the tagged element data 303 may be implemented as a string or may contain string values. In an embodiment, the tagged element data 303 may be numeric values, such as 32-bit unsigned integers represented not as decimal strings, but each via its component 4 bytes in big-endian order. In an embodiment, the tagged element data 303 may be a mix of textual and numeric data, and other data types, according to, for example, the ICC profile format specification. The tagged element data 303 may be just a sequence of bytes, and the technique described here may be applicable no matter how those bytes are to be interpreted. Strings and textual data are used in the figures and examples to simplify the presentation without reducing the scope of the invention. The size of the profile header 301 may be constant according to a standard specification. In the illustrated example, the profile header 301 may contain 128 bytes or some other amount of data. The tag table 302 may include a tag count 304 specifying how many tags are included in the tag table 302. The tag table 302 may comprise one or more rows $305_1$ to $305_n$, each of which may correspond to a tag. Each of the rows $305_1$ to $305_n$ may include a signature field 306, an offset field 307, and a size field 308. The signature field 306 may specify an identifier for a tag. The offset field 307 may specify an offset for the value of a tag within the tagged element data 303. The size field 308 may specify the size of the tag value in characters within the tagged element data 303. The tagged element data 303 may contain elements $309_1$ to $309_k$. Each of the elements $309_1$ to $309_k$ may store a tag value corresponding to a tag specified in one of the rows $305_1$ to $305_n$. In an embodiment, n and k may be distinct integer values.

Color profiles may be transmitted with an image file or embedded within the image file if the file supports embedded metadata. When the image needs to be rendered on a device (e.g., a printer or a monitor), a color management system may transform the image pixels to an absolute color space using the color profile of the image and further transform them from the absolute color space to a color space specific to the device using a color profile unique to that device. However, when performed according to techniques available in the prior art, such color space transformations often consume excessive amounts of data or have high bandwidth requirements. If the social networking system 130 serves hundreds of millions of users who may share potentially billions of images, conventional techniques may be unwieldy and inefficient. To address these shortcomings, embodiments of the invention provide techniques that may reduce the size of color profiles and thereby facilitate significant reductions in processing bandwidth required for color space transformations in a lossless manner without sacrificing image quality.

Figure 4A:
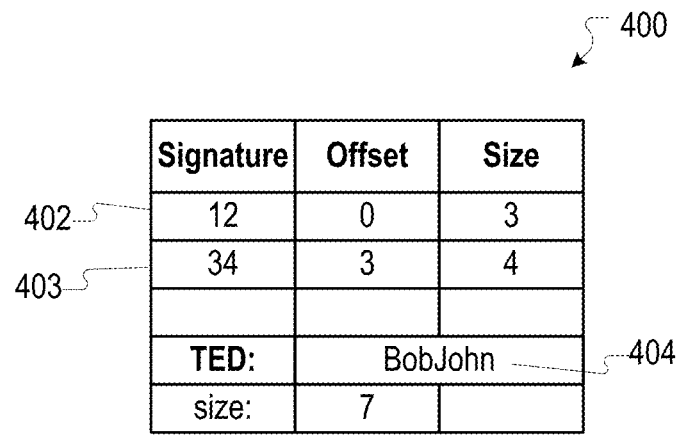
FIG. 4A illustrates an example partial tag-based file in accordance with an embodiment of the invention
Figure 4B:
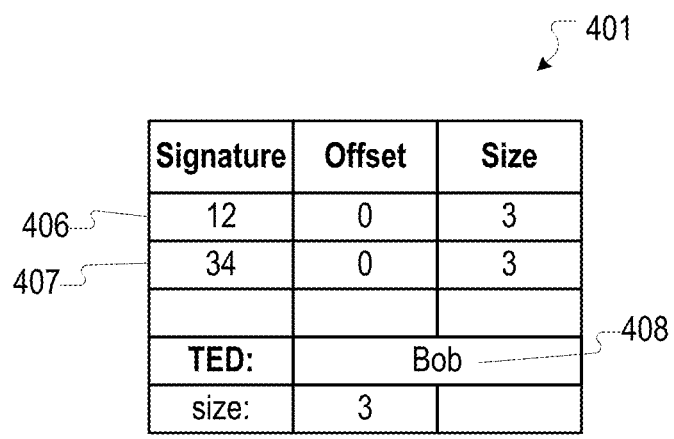
FIG. 4B illustrates an example partial tag-based file with data sharing in accordance with an embodiment of the invention.

According to an embodiment of the invention, tag table data fields may be adjusted such that the rows in the tag table correspond to the same sequence in the tagged element data string. For example, if multiple tags have the same tag value, then the size and offset fields in the rows of the tag table corresponding to the tags may be equal. FIGS. 4A and 4B illustrate example partial tag-based files 400 and 401, respectively, in accordance with an embodiment of the invention. The partial tag-based file 400 includes a tag 402 with signature 12, offset 0, and whose size is 3, as well as a tag 403 with signature 34, offset 3, and whose size is 4. The tag 402 may be an author tag having a value of 'Bob'. The tag 403 may be a producer tag having a value of 'John'. Thus, a tagged element data string 404 includes the sequence 'BobJohn'. However, data within a tagged element data string may be shared between equal tag values. As illustrated in FIG. 4B, if the value of a tag 406 and the value of a tag 407 are both 'Bob', then each of the offset values in the tag table may be adjusted to point to the same sequence in a tagged element data string 408. In partial tag-based file 401, the tag 406 has signature 12, offset 0, and size 3, and the tag 407 has signature 34, offset 0, and size 3. Because the offset and size values are equal in the author tag 406 and the producer tag 407, they point to the same sequence in the tagged element data string 408. Thus, the tagged element data string 408 includes the sequence 'Bob'.

According to an embodiment of the invention, tag table data may be adjusted such that the rows of the tags in the tag table correspond to any subsequence of a tagged element data string. A subsequence, or substring, may be consecutive characters constituting a portion of a tagged element data string. If multiple tags have the same value, a tag value is equal to a subsequence of another tag value, or a tag value is equal to a subsequence that spans tag value boundaries in the tagged element data string, then the tag table data fields may be adjusted such that the rows of the tags in the tag table point to the corresponding values in the tagged element data string. FIGS. 5A, 5B, 5C, 5D, and 5E illustrate a table 501 of example tag data and corresponding partial tag-based files 502, 503, 504, 505, respectively, in accordance with an embodiment of the invention. The table 501 of FIG. 5A lists the signatures and values of six tags 507, 508, 509, 510, 511, 512. The partial tag-based file 502 of FIG. 5B incorporates the values of the tags 507, 508, 509, 510, 511, 512 in a tagged element data string 513. The tagged element data string 513 is a concatenation of the values of each tag in the table 501.

However, sharing of data between tags with equal values may yield a shorter tagged element data string, such as a tagged element data string 514 in the tag-based file 503 of FIG. 5C. As indicated in the table 501, the value of the tag 510 and the value of the tag 512 are both 'de'. Thus, instead of repeating 'de' in the tagged element data string 514, the offset value of row 515 corresponding to tag 512 may be adjusted such that it points to the same set of characters in the tagged element data string 514 as the offset value of row 506 corresponding to the tag 510. The latter 'de' may be omitted, resulting in the shorter sequence 'ababcdecd' in the tagged element data string 514.

Data sharing may also occur between subsequences of tag values. In the partial tag-based file 504 of FIG. 5D, tag values that are equal to subsequences of other tag values have been omitted from the tagged element data string 513, resulting in the tagged element data string 516. The leading subsequence 'ab' of the tagged element data string 513, which corresponds to the value 'a' of the tag 507 and the value 'b' of the tag 508, may be omitted because 'a' and 'b' are subsequences of the value of tag 509, 'abc'. Removal of the leading subsequence 'ab' results in the shorter sequence 'abcdecd'. The offset values of rows 517, 518, 519, 520—which correspond to tags 509, 510, 511, 512, respectively—may be adjusted to reflect the removal of two leading characters from the tagged element data string 514. For example, the offset value of row 517 has been changed to zero.

Data sharing may also occur across the boundaries of tag values in a tagged element data string. A boundary of a tag value may be the beginning of the tag value or the end of the tag value. In the tagged element data string 516, the subsequences 'abc' and 'de' may correspond to distinct tag values of the tag 509 and the tag 510, respectively. The value of the tag 511, 'cd', is a subsequence of their concatenation 'abcde' and spans the boundaries of the tag value 'abc' and 'de'. Thus, in the partial tag-based file 505 of FIG. 5E, the trailing subsequence 'cd' may be omitted from the tagged element data string 516, resulting in the shorter sequence 'abcde' in a tagged element data string 521. The offset value of row 522 corresponding to tag 511 may be adjusted such that it points to the appropriate subsequence of the tagged element data string 521. For example, the offset value of the row 522 has been changed to two.

Figure 6:
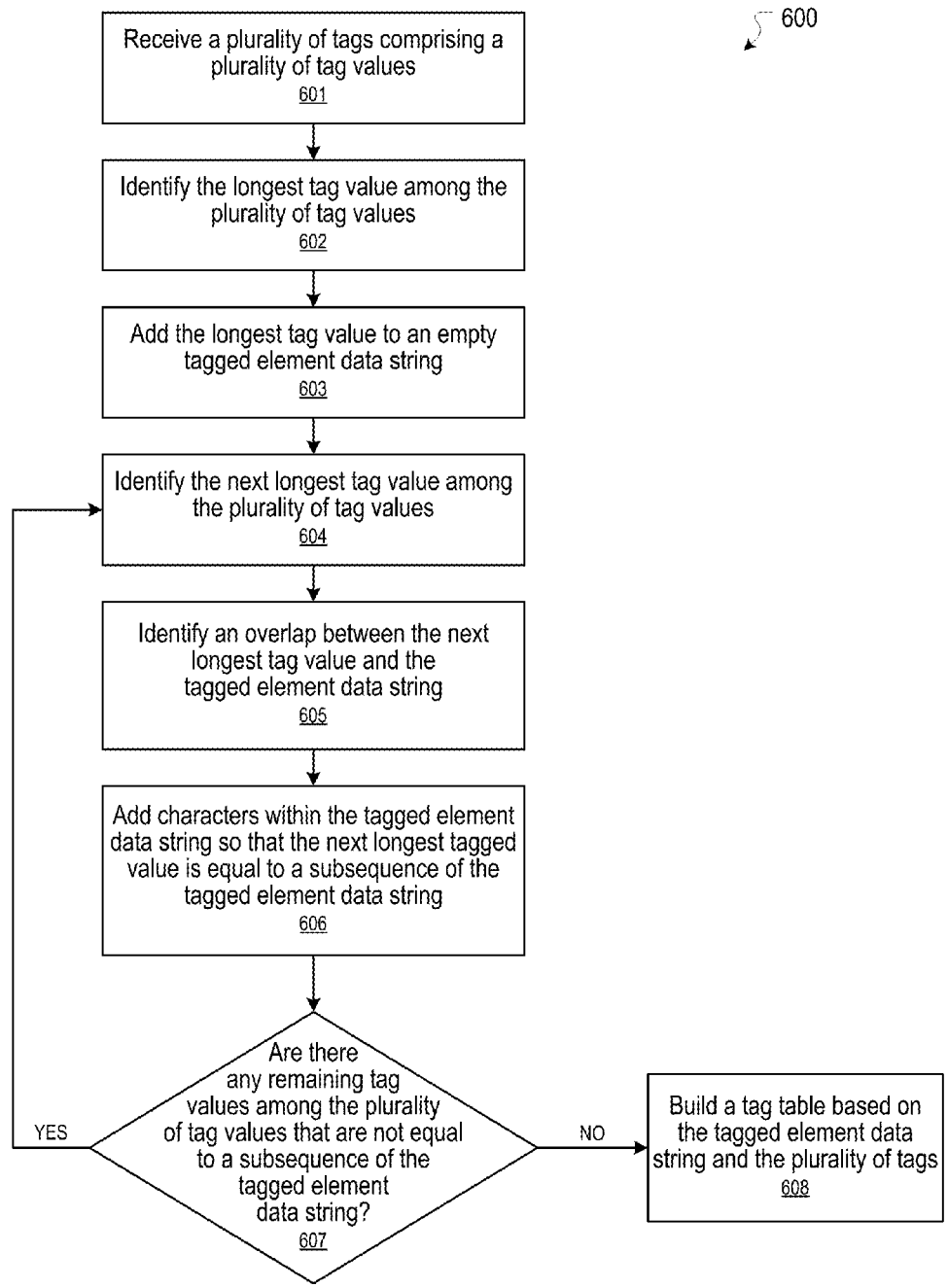
FIG. 6 illustrates a process for building a tagged element data string and a tag table by identifying overlaps between tag values and subsequences of the tagged element data string in accordance with an embodiment of the invention.

FIG. 6 illustrates a process 600 for building a tagged element data string and a tag table by identifying overlaps between tag values and subsequences of the tagged element data string in accordance with an embodiment of the invention. At block 601, the social networking system 130 receives a plurality of tags comprising a plurality of tag values. At block 602, the social networking system 130 identifies the longest tag value among the plurality of tag values. In an embodiment, the longest tag value is the tag value that comprises the greatest number of characters. At block 603, the social networking system 130 adds the longest tag value to an empty tagged element data string. At block 604, the social networking system 130 identifies the next longest tag value among the plurality of tag values. In an embodiment, the next longest tag value is the longest tag value among the plurality of tag values that is not equal to any subsequence of the tagged element data string. At block 605, the social networking system 130 identifies an overlap between the next longest tag value and the tagged element data string. In an embodiment, the overlap may comprise an equivalence between any portion of the tag value and any subsequence of the tagged element data string. At block 606, the social networking system 130 adds characters within the tagged element data string so that the next longest tagged value is equal to a subsequence of the tagged element data string. At block 607, the social networking system 130 determines if there are any remaining tag values among the plurality of tag values that are not equal to a subsequence of the tagged element data string. If there are any remaining tag values among the plurality of tag values that are not equal to a subsequence of the tagged element data string, then the process 600 returns to block 604. If there are no remaining tag values among the plurality of tag values that are not equal to a subsequence of the tagged element data string, then at block 608, the social networking system 130 builds a tag table based on the tagged element data string and the plurality of tags.

Figure 7:
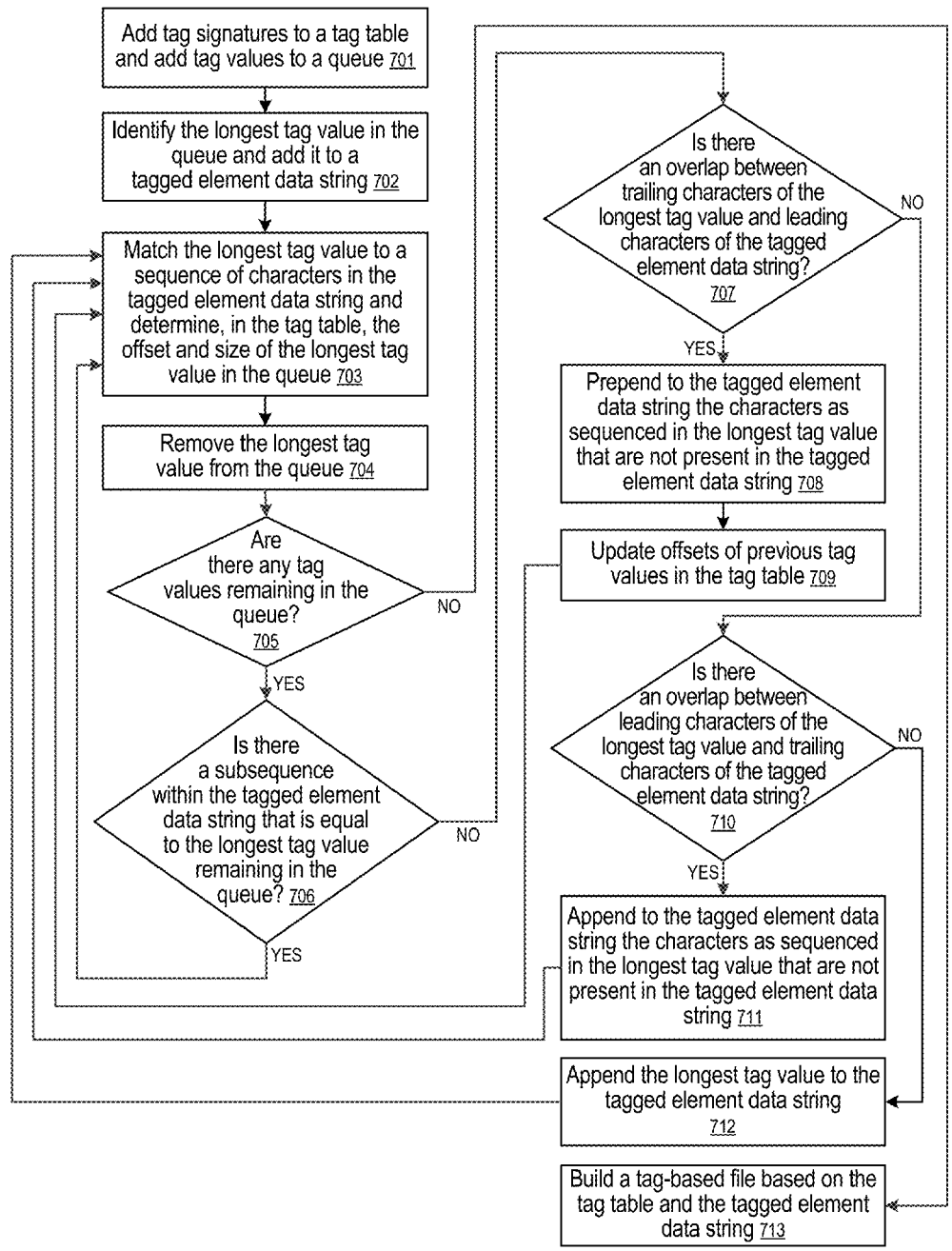
FIG. 7 illustrates a process for sharing characters within a tagged element data string between tags in accordance with an embodiment of the invention.

FIG. 7 illustrates a process 700 for sharing characters within a tagged element data string among tags in accordance with an embodiment of the invention. Initially, a set of tags is received. Each tag may comprise a tag signature and a tag value including any number of characters. The social networking system 130 initializes an empty tagged element data string. At block 701, the social networking system 130 adds the tag signatures to a tag table and the tag values to a queue. At block 702, the social networking system 130 identifies the longest tag value remaining in the queue and adds it to the tagged element data string. At block 703, the social networking system 130 matches the longest tag value to a sequence of characters in the tagged element data string and determines the offset and size of the longest tag value within the tagged element data string. For a first longest tag value, the offset is zero. For each subsequent longest tag value, the offset may be determined based on the position of a subsequence in the tagged element data string that is equal to the longest tag value. At block 704, the social networking system 130 removes the longest tag value from the queue. At block 705, the social networking system 130 determines if there are any tag values remaining in the queue. If there is at least one tag value remaining in the queue, then the process 700 proceeds to block 706. If there are no tag values remaining in the queue, then the process 700 proceeds to block 713. At block 706, the social networking system 130 determines if there is a subsequence within the tagged element data string that is equal to the longest tag value remaining in the queue. If there is a subsequence within the tagged element data string that is equal to the longest tag value, then the process 700 returns to block 703. If there is no subsequence within the tagged element data string that is equal to the longest tag value, then the process 700 proceeds to block 707.

At block 707, the social networking system determines if there is an overlap between trailing characters of the longest tag value and leading characters of the tagged element data string. If there is an overlap between trailing characters of the longest tag value and leading characters of the tagged element data string, then the process 700 proceeds to block 708. If there is no overlap between trailing characters of the longest tag value and leading characters of the tagged element data string, then the process 700 proceeds to block 710. At block 708, the social networking system 130 prepends to the tagged element data string the characters as sequenced in the longest tag value that are not present in the tagged element data string. From block 708, the process 700 proceeds to block 709. At block 709, the social networking system 130 updates the offsets of previous tag values in the tag table. Because offsets may be determined with reference to the leftmost character in the tagged element data string, the offsets may no longer be accurate after prepending additional characters to the tagged element data string. In an embodiment, the offsets may be updated by incrementing each offset by the number of characters prepended.

At block 710, the social networking system 130 determines if there is an overlap between leading characters of the longest tag value and trailing characters of the tagged element data string. If there is an overlap between leading characters of the longest tag value and trailing characters of the tagged element data string, then the process 700 proceeds to block 711. If there is no overlap between leading characters of the longest tag value and trailing characters of the tagged element data string, then the process 700 proceeds to block 712. At block 711, the social networking system 130 appends to the tagged element data string the characters as sequenced in the longest tag value that are not present in the tagged element data string. From block 711, the process 700 returns to block 703. At block 712, the social networking system 130 appends the longest tag value to the tagged element data string. From block 712, the process 700 returns to block 703. At block 713, which is performed when the queue is empty and all tag values have been processed, the social networking system 130 builds a tag-based file based on the tag table and the tagged element data string.

The process 700 may be effective and efficient, but it may, in certain instances, may lead to suboptimal results. If tag values of equal length are processed in arbitrary order, then the resulting tagged element data string may not be of the shortest possible length. For example, if the tag values of equal length 'cd', 'fe', and 'ec' are processed in that order, the process 700 would result in a tagged element data string of 'cd' after block 702, 'cdfe' after block 712, and 'ecdfe' after block 708. However, if the tag values are processed in the order 'fe', 'cd', and 'ec', then the process 700 would result in a tagged element data string of 'fe' after block 702, 'fecd' after block 712, and 'fecd' after block 706. Thus, in an embodiment, the processing of tag values of equal length may be selectively ordered to optimize and shorten the length of the tagged element data string.

Similarly, in certain contexts, there may be an overlap between trailing characters of the longest tag value and leading characters of the tagged element data string as well as an overlap between leading characters of the longest tag value and trailing characters of the tagged element data string. In these contexts, the process 700 may result in the addition of more characters than necessary to the tagged element data string. For example, if a tagged element data string is 'gabcdef' and the longest tag value in the queue is 'defg', appending 'g' to the tagged element data string may result in a shorter tagged element data string than prepending 'def' because the overlap between the leading characters of the tag value and the trailing characters of the tagged element data string is greater than the overlap between the trailing characters of the tag value and the leading characters of the tagged element data string. However, the process 700 would result in a tagged element data string of 'defgabcdef' because block 707 is performed before block 710. In an embodiment, this concern may be addressed by simultaneously determining whether there is an overlap between trailing characters of the longest tag value and leading characters of the tagged element data string and an overlap between leading characters of the longest tag value and trailing characters of the tagged element data string. If both kinds of overlaps exist, then the social networking system 130 may prepend or append characters to the tagged element data string based on whether prepending or appending would result in the addition of fewer characters to the tagged element data string.

Some tag-based file format specifications may impose constraints on allowed offsets. For example, a specification may require that offsets be a multiple of four. Such requirements may necessitate adjustments to the process 700. In an embodiment, the social networking system 130 may only consider subsequences of the tagged element data string that begin on valid offsets. In an embodiment, the social networking system 130 may require, in block 707, that the number of characters in the longest tag value that are not in the tagged element data string be a multiple of four. In an embodiment, the social networking system 130 may require, in block 710, that the overlap within the tagged element data string between the leading characters of the tag value and the trailing characters of the tagged element data string begin on a valid offset.

According to one embodiment of the invention, run-length encoding (RLE) may be used to compress portions of a tag-based file. Run-length encoding is a compression technique in which the size of data comprising long sequences of identical bytes may be minimized by transmitting the number of bytes contained in the sequence rather than the entire sequence itself. For example, a sequence '0000000000' (or any other sequence of identical digits) may be transmitted by transmitting a single 0 and a variable indicating that the sequence comprises ten bytes rather than transmitting the entire sequence. Hence, transmitting a sequence of zeros may take less time than transmitting a sequence of equal length comprising random bytes. Even if the size of the header of a tag-based file is fixed, there may be leeway regarding its contents. For example, the header may contain data fields that are required to have certain values (e.g., the length of the file and version of the applicable specification), and others whose values are left to the discretion of the author (e.g., a creation date). In discretionary data fields in which the author has not specified a meaningful value, zeros may be used to take advantage of RLE.

According to an embodiment of the invention, padding may need to be added between the tagged element data string and the appended tag value so that the subsequence of the tagged element data string that is equal to the tag value begins at a valid offset. In an embodiment, the padding may include one or more zeros so that run-length encoding may be used. In an embodiment, the padding may include one or more sentinel characters. A sentinel character may be a placeholder that is treated as a wildcard character. A sentinel character may be replaced with another character as the process 700 proceeds to completion. The replacement character may be a character from a tag value or a zero. In an embodiment, sentinel characters may only be appended to a tagged element data string when followed by a tag value. This embodiment may avoid the appending of useless trailing sentinel characters to a tagged element data string. This embodiment may also address the shortcomings of techniques in which padding is appended to a tagged element data string to ensure that the number of characters in the tagged element data string is a multiple of four. Some conventional techniques append padding as soon as they append a value to the string. For example, if the string is empty, and tag value 'ab' is added, then inefficient conventional techniques may proactively add padding at that point, producing a data string of 'ab00'. The intent of conventional techniques is to ensure that, when additional tag values are appended, they will also start at a valid offset; so, if 'cd' is appended next, the conventional techniques may produce 'ab00cd00'. But a drawback of these conventional techniques is that if no tag value is added later on, the last-added padding may remain and may be wasteful, and not more desirably result in 'ab00cd'.

For example, the social networking system 130 may process two tag values 'ab' and 'def', in that order. The social networking system 130 may add the tag value 'ab' to an empty tagged element data string. Before appending the tag value 'def' to the tagged element data string, the social networking system 130 may append a sequence of sentinel characters to comply with a requirement in the tag-based file format specification. If the specification requires that the offsets be a multiple of four, then the social networking system 130 may append a sequence of two sentinel characters 'XX' to the tag value 'ab' followed by the tag value 'def', resulting in a tagged element data string 'abXXdef'. If the social networking system 130 next processes a tag value 'abc', the leftmost sentinel character may be interpreted to match 'c' and the tag value 'abc' may thus be regarded as equal to the subsequence 'abX'. Upon matching the tag value 'ab' to the subsequence 'abX', the social networking system 130 may replace the sentinel character in the subsequence 'abX' with 'c', yielding the tagged element data string abcXdef. At the conclusion of the process 700, the social networking system 130 may replace any remaining sentinel characters with zeros so that run-length encoding may be used.

Some tag-based file specifications may include tag dependencies, which require certain tags based on the inclusion of other tags. An independent tag may refer to a tag whose inclusion triggers the required inclusion of another tag. A dependent tag may refer to a tag whose inclusion is required based on the inclusion of an independent tag. For example, it may be required to include a copyright date tag in a tag-based file if a copyright owner tag is included. A dependent tag value may be appended to an independent tag value, prepended to an independent tag value, embedded within an independent tag value, or otherwise accompanied by an independent tag value. Dependent tag values may also be received as stand-alone tag values. The tag value of a dependent tag may be irrelevant or unimportant to the author of an image file. In this regard, the fact that the specification requires the inclusion of a dependent tag may not necessarily mean that the author wishes to set the tag to a particular value. In an embodiment, dependent tags may be added to a tagged element data string by taking advantage of sentinel characters and other characters within the tagged element data string.

According to an embodiment of the invention, dependent tag values may be processed after all other tags. Dependent tag values may be totally undefined or partially undefined. A totally undefined tag value may refer to a tag value with no constraints on the number of characters or their value. A partially undefined tag may contain some defined characters or constraints. A partially defined tag value may be added to a tagged element data string by locating the defined characters of the tag value within the tagged element data string and treating the surrounding characters within the tagged element data string as wildcard characters.

For example, a tag whose tag value must end in zero but may be preceded by any number of characters of any value is a partially defined tag. The partially undefined tag value may be added to a tagged element data string 'ab00def' by matching the zero within the partially defined tag value to either of the zeros in the tagged element data string. The offset and size values in the tag table may be determined as if the partially defined tag value is 'ab0' or 'ab00'. The partially undefined tag value may be added to a tagged element data string 'abXXdef', wherein the 'XX' is a subsequence of sentinel characters, by matching either of the sentinel characters to '0' and substituting a zero for the matched sentinel character. The tagged element data string may be 'ab0Xdef' or 'abX0def' and the offset and size values in the tag table may be determined as if the partially undefined tag value is 'ab0' or 'abX0', respectively. The partially undefined tag value may be added to a tagged element data string 'abdef' by appending '0' and determining the offset and size values in the tag table as if the partially undefined tag value is 'f0', 'ef0', 'def0', 'bdef0', or 'abdef0'. In an embodiment, if the tag-based file format specification requires offsets to be multiples of four, then the offset and size values may be determined as if the partially defined tag value is 'f0' or 'abdef0'.

According to an embodiment of the invention, a partially undefined tag value may include defined leading characters and defined trailing characters separated by a subsequence of undefined characters of any length. For example, a partially undefined tag value may begin with 'ab', end with 'd', and include any single character in between. The partially undefined tag value may be added to a tagged element data string 'ab' by appending 'Xd', wherein 'X' is a sentinel character, and determining the offset and size values in the tag table as if the partially defined tag value is 'abXd'. As another example, a partially undefined tag value may begin with 'abc', end with 'e', and include any single character in between. The partially defined tag value may be added to a tagged element data string 'abXXe', wherein 'XX' is a subsequence of sentinel characters, by matching and substituting a 'c' for the leftmost sentinel character and determining the offset and size values in the tag table as if the partially undefined tag value is 'abcXe'.

In an embodiment, dependent tag values may be processed in order from longest defined portion to shortest defined portion. This may result in the shortest possible tagged element data string. For example, a tag whose tag value must end in zero but may be preceded by any number of characters of any value is a first partially undefined tag and a tag whose tag value must begin with 'abc' and end with any single character is a second partially undefined tag. If the tags are processed in order from longest defined portion to shortest defined portion, the second partially undefined tag value may be added to a tagged element data string 'abXXcdXX', wherein the 'XX' subsequences are subsequences of sentinel characters. The "c" of the second partially undefined tag value may match and substitute for the leftmost sentinel character. The first partially undefined tag value may be added to a tagged element data string 'abcXcdXX' by matching and substituting '0' for the second-leftmost sentinel character, resulting in a tagged element data string 'abc0cdXX'. However, if the tags are processed in reverse order, then the first partially undefined tag value may be added to the tagged element data string 'abXXcdXX' by matching and substituting '0' for the leftmost sentinel character. The second partially undefined tag value may be added to a tagged element data string 'ab0XcdXX' by appending 'abcX' (if the specification requires that the offsets be a multiple of four), resulting in a tagged element data string 'ab0XcdXXabcX'. In an embodiment, dependent tag values may be processed without regard to size in order to facilitate simplicity and speed.

Hardware Implementation

Figure 8:
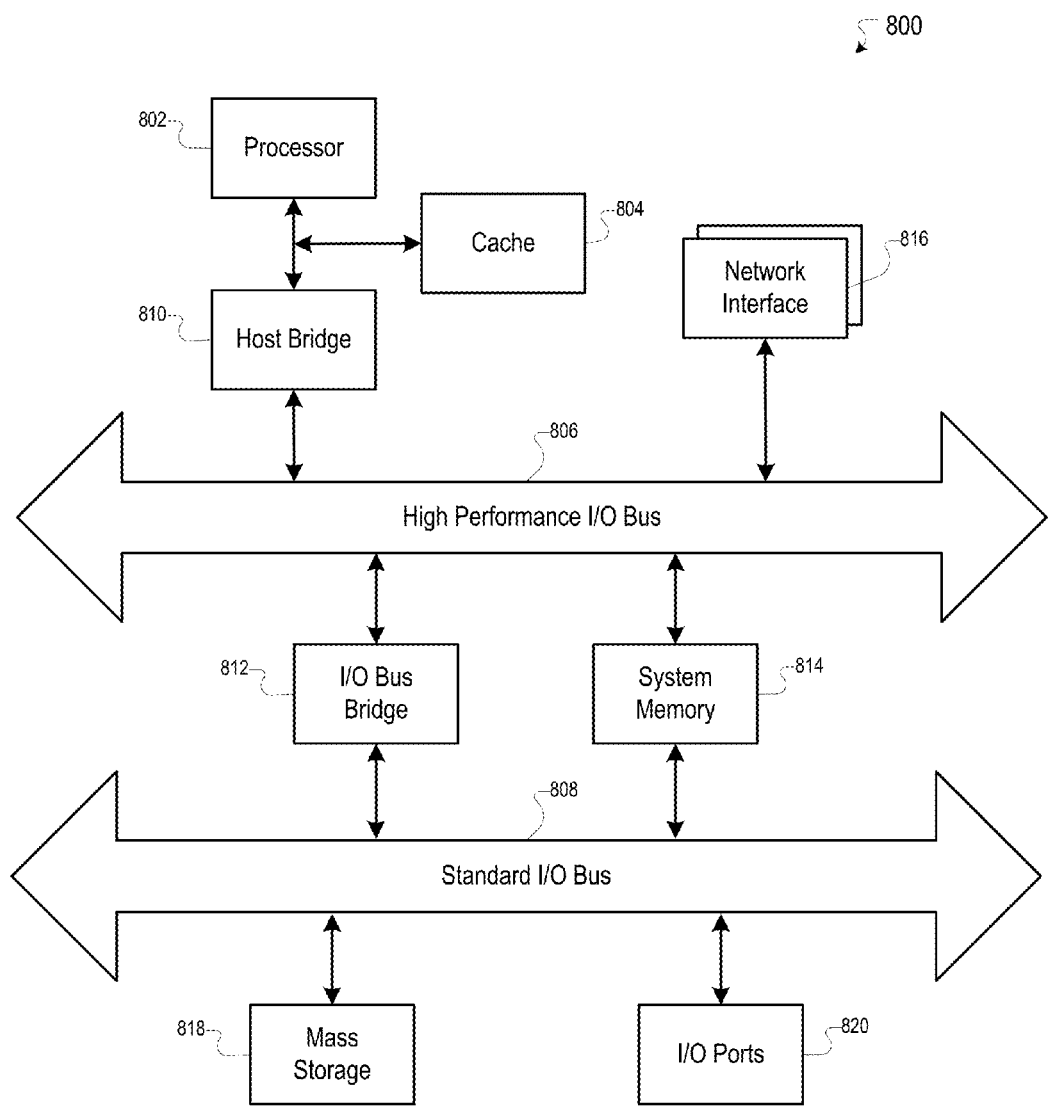
FIG. 8 illustrates an example of a computer system that may be used to implement one or more of the embodiments described herein in accordance with an embodiment of the invention.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 130, the user device 110, and the external system 120, or a component thereof. In an embodiment of the invention, the computer system 800 may be one server among many that constitutes all or part of the social networking system 130.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
   identifying, by a computer system, a match between at least a portion of a longest tag value from a plurality of tag values and a subsequence of a tagged element data string in a tag-based file associated with an image; and
   optimizing, by the computer system, the tagged element data string and a tag table based at least in part on the match.

2. The computer-implemented method of claim 1, wherein the match comprises a match between at least one trailing character of the longest tag value or the portion of the longest tag value and at least one leading character of the tagged element data string.

3. The computer-implemented method of claim 2, wherein the optimizing comprises prepending, to the tagged element data string, a portion of the at least one tag value that is not present in the tagged element data string.

4. The computer-implemented method of claim 1, wherein the match comprises a match between at least one leading character of the longest tag value or the portion of the longest tag value and at least one trailing character of the tagged element data string.

5. The computer-implemented method of claim 4, wherein the optimizing comprises appending, to the tagged element data string, a portion of the at least one tag value that is not present in the tagged element data string.

6. The computer-implemented method of claim 1, further comprising adding remaining tag values from the plurality of tag values to the tagged element data string in order from a longest remaining tag value to a shortest remaining tag value.

7. The computer-implemented method of claim 1, further comprising adding at least one sentinel character to the tagged element data string.

8. The computer-implemented method of claim 7, further comprising substituting at least one zero for the at least one sentinel character in the tagged element data string.

9. The computer-implemented method of claim 8, wherein the optimizing comprises compressing the tagged element data string based at least in part on run-length encoding.

10. The computer-implemented method of claim 1, wherein the optimizing is based further at least in part on a format specification.

11. The computer-implemented method of claim 1, wherein the tag table comprises one or more offset values, one or more size values, and one or more signatures.

12. The computer-implemented method of claim 11, wherein one or more of the offset values is a multiple of four.

13. The computer-implemented method of claim 1, wherein the match comprises a match between a first tag value from the plurality of tag values and a second tag value from the plurality of tag values.

14. The computer-implemented method of claim 1, wherein the match comprises a match between a first tag value from the plurality of tag values and a subsequence of a second tag value from the plurality of tag values.

15. The computer-implemented method of claim 1, wherein the match comprises a match between the longest tag value or the portion of the longest tag value and a subsequence that spans one or more tag value boundaries in the tagged element data string.

16. The computer-implemented method of claim 1, wherein the optimizing comprises creating a shortest possible tagged element data string.

17. The computer-implemented method of claim 1, wherein the longest tag value is associated with a dependent tag.

18. The computer-implemented method of claim 17, further comprising designating at least one character in the tagged element data string as a wildcard character to match an undefined portion of the dependent tag.

19. A system comprising:
one or more processors; and
a memory coupled to the processor comprising instructions executable by the processors, the processors being operable when executing the instructions to:
identify a match between at least a portion of a longest tag value from a plurality of tag values and a subsequence of a tagged element data string in a tag-based file associated with an image; and
optimize the tagged element data string and a tag table based at least in part on the match.

20. One or more computer-readable non-transitory storage media embodying software that is operable when executed to:
identify a match between at least a portion of a longest tag value from a plurality of tag values and a subsequence of a tagged element data string in a tag-based file associated with an image; and
optimize the tagged element data string and a tag table based at least in part on the match.

21. The system of claim 19, wherein the match comprises a match between at least one trailing character of the longest tag value or the portion of the longest tag value and at least one leading character of the tagged element data string.

22. The system of claim 21, wherein the instructions to optimize comprise instructions to prepend, to the tagged element data string, a portion of the at least one tag value that is not present in the tagged element data string.

23. The system of claim 19, wherein the match comprises a match between at least one leading character of the longest tag value or the portion of the longest tag value and at least one trailing character of the tagged element data string.

24. The system of claim 23, wherein the instructions to optimize comprise instructions to append, to the tagged element data string, a portion of the at least one tag value that is not present in the tagged element data string.

25. The system of claim 19, the processors being further operable when executing the instructions to add remaining tag values from the plurality of tag values to the tagged element data string in order from a longest remaining tag value to a shortest remaining tag value.

26. The system of claim 19, the processors being further operable when executing the instructions to add at least one sentinel character to the tagged element data string.

27. The system of claim 26, the processors being further operable when executing the instructions to substitute at least one zero for the at least one sentinel character in the tagged element data string.

28. The system of claim 27, wherein the instructions to optimize comprise instructions to compress the tagged element data string based at least in part on run-length encoding.

29. The system of claim 19, wherein the instructions to optimize comprise instructions to optimize based further at least in part on a format specification.

30. The system of claim 19, wherein the tag table comprises one or more offset values, one or more size values, and one or more signatures.

31. The system of claim 30, wherein one or more of the offset values is a multiple of four.

32. The system of claim 19, wherein the match comprises a match between a first tag value from the plurality of tag values and a second tag value from the plurality of tag values.

33. The system of claim 19, wherein the match comprises a match between a first tag value from the plurality of tag values and a subsequence of a second tag value from the plurality of tag values.

34. The system of claim 19, wherein the match comprises a match between the longest tag value or the portion of the longest tag value and a subsequence that spans one or more tag value boundaries in the tagged element data string.

35. The system of claim 19, wherein the instructions to optimize comprise instructions to create a shortest possible tagged element data string.

36. The system of claim 19, wherein the longest tag value is associated with a dependent tag.

37. The system of claim 36, the processors being further operable when executing the instructions to designate at least one character in the tagged element data string as a wildcard character to match an undefined portion of the dependent tag.

38. The media of claim 20, wherein the match comprises a match between at least one trailing character of the longest tag value or the portion of the longest tag value and at least one leading character of the tagged element data string.

39. The media of claim 38, wherein the software operable when executed to optimize comprises software operable when executed to prepend, to the tagged element data string, a portion of the at least one tag value that is not present in the tagged element data string.

40. The media of claim 20, wherein the match comprises a match between at least one leading character of the longest tag value or the portion of the longest tag value and at least one trailing character of the tagged element data string.

41. The media of claim 40, wherein the software operable when executed to optimize comprises software operable when executed to append, to the tagged element data string, a portion of the at least one tag value that is not present in the tagged element data string.

42. The media of claim 20, the software being further operable when executed to add remaining tag values from the plurality of tag values to the tagged element data string in order from a longest remaining tag value to a shortest remaining tag value.

43. The media of claim 20, the software being further operable when executed to add at least one sentinel character to the tagged element data string.

44. The media of claim 43, the software being further operable when executed to substitute at least one zero for the at least one sentinel character in the tagged element data string.

45. The media of claim 44, wherein the software operable when executed to optimize comprises software operable when executed to compress the tagged element data string based at least in part on run-length encoding.

46. The media of claim 20, wherein the software operable when executed to optimize comprises software operable when executed to optimize based further at least in part on a format specification.

47. The media of claim 20, wherein the tag table comprises one or more offset values, one or more size values, and one or more signatures.

48. The media of claim 47, wherein one or more of the offset values is a multiple of four.

49. The media of claim 20, wherein the match comprises a match between a first tag value from the plurality of tag values and a second tag value from the plurality of tag values.

50. The media of claim 20, wherein the match comprises a match between a first tag value from the plurality of tag values and a subsequence of a second tag value from the plurality of tag values.

51. The media of claim 20, wherein the match comprises a match between the longest tag value or the portion of the longest tag value and a subsequence that spans one or more tag value boundaries in the tagged element data string.

52. The media of claim 20, wherein the software operable when executed to optimize comprises software operable when executed to create a shortest possible tagged element data string.

53. The media of claim 20, wherein the longest tag value is associated with a dependent tag.

54. The media of claim 53, the software being further operable when executed to designate at least one character in the tagged element data string as a wildcard character to match an undefined portion of the dependent tag.

* * * * *